US008214676B2

(12) United States Patent
Katoh

(10) Patent No.: US 8,214,676 B2
(45) Date of Patent: Jul. 3, 2012

(54) INFORMATION PROCESSING APPARATUS, POWER MODE CONTROL METHOD, AND POWER MODE CONTROL PROGRAM PRODUCT

(75) Inventor: Katsuhiko Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 445 days.

(21) Appl. No.: 12/363,941

(22) Filed: Feb. 2, 2009

(65) Prior Publication Data
US 2009/0259868 A1 Oct. 15, 2009

(30) Foreign Application Priority Data
Feb. 6, 2008 (JP) ................................. 2008-026600

(51) Int. Cl.
*G06F 1/32* (2006.01)
(52) U.S. Cl. ....................................................... 713/324
(58) Field of Classification Search .................... 713/323
See application file for complete search history.

(56) References Cited

U.S. PATENT DOCUMENTS

| 7,516,335 B2* | 4/2009 | Watanabe | 713/300 |
| 7,543,165 B2* | 6/2009 | Inoue | 713/300 |
| 7,843,953 B2* | 11/2010 | Kawata et al. | 370/419 |
| 2005/0216776 A1* | 9/2005 | Watanabe | 713/300 |
| 2006/0218440 A1* | 9/2006 | Inoue | 714/12 |
| 2008/0133953 A1* | 6/2008 | Kawaji | 713/322 |
| 2008/0195688 A1* | 8/2008 | Watanabe | 709/201 |
| 2009/0119522 A1* | 5/2009 | Satoh | 713/320 |
| 2009/0125739 A1* | 5/2009 | Satoh | 713/322 |
| 2009/0164816 A1* | 6/2009 | Yasuda | 713/320 |
| 2009/0204829 A1* | 8/2009 | Fukuda | 713/321 |
| 2009/0282278 A1* | 11/2009 | Satoh | 713/321 |

FOREIGN PATENT DOCUMENTS

| JP | 2003-191570 | 7/2003 |
| JP | 2005-267100 | 9/2005 |
| JP | 2005-269103 | 9/2005 |
| JP | 2006-309731 | 11/2006 |
| JP | 2007-221239 | 8/2007 |
| JP | 2007-274574 | 10/2007 |

OTHER PUBLICATIONS

Office Action issued Aug. 16, 2011, in Japanese Patent Application No. 2008-026600.

* cited by examiner

*Primary Examiner* — Ryan Stiglic
(74) *Attorney, Agent, or Firm* — Oblon, Spivak, McClelland, Maier & Neustadt, L.L.P.

(57) ABSTRACT

An information processing apparatus switches from a regular power mode to a power saving mode in the event that a first control unit does not process packets for a certain period of time. The information processing apparatus includes a packet table in which packets to be processed by the first control unit are registered, and a determining unit for determining whether the system of the information processing apparatus can switch to the power saving mode. In the event that the determining unit determines that the system can switch to the power saving mode, a network controller processes the packets based on the packet table.

17 Claims, 16 Drawing Sheets

FIG.5

| PROTOCOL TABLE | | |
|---|---|---|
| Appletalk | INEFFECTIVE | |
| Netware | INEFFECTIVE | |
| PING | INEFFECTIVE | |
| ARP | INEFFECTIVE | |
| SMB | INEFFECTIVE | |
| FTP | EFFECTIVE | 501 |
| DHCP | EFFECTIVE | 502 |
| SNMP FROM Windows | INEFFECTIVE | |
| OTHER SNMP | EFFECTIVE | 503 |
| BMLinks | INEFFECTIVE | |
| LPD | EFFECTIVE | 504 |
| IPP | EFFECTIVE | 505 |

FIG.6

| PROTOCOL SAVING PAGE | | | |
|---|---|---|---|
| Appletalk | INEFFECTIVE | DHCP | EFFECTIVE |
| Netware | INEFFECTIVE | SNMP FROM Windows | EFFECTIVE |
| PING | EFFECTIVE | OTHER SNMP | EFFECTIVE |
| ARP | EFFECTIVE | BMLinks | INEFFECTIVE |
| SMB | EFFECTIVE | LPD | EFFECTIVE |
| FTP | EFFECTIVE | IPP | EFFECTIVE |

FIG.7

PROTOCOL TABLE

| Appletalk | INEFFECTIVE |
| Netware | INEFFECTIVE |
| PING | EFFECTIVE |
| ARP | EFFECTIVE |
| SMB | EFFECTIVE |
| FTP | EFFECTIVE |
| DHCP | EFFECTIVE |
| SNMP FROM Windows | EFFECTIVE |
| OTHER SNMP | EFFECTIVE |
| BMLinks | INEFFECTIVE |
| LPD | EFFECTIVE |
| IPP | EFFECTIVE |

FIG.10

| DLC HEADER | | |
|---|---|---|
| TYPE | PROTOCOL | OPERATION |
| VALUE | | |
| 0x0000~0x05DC (DETERMINE AS LESS THAN 0x800) | IEEE802.3 Length | S4 |
| 0x0800 | Ipv4 | S1 |
| 0x0806 | ARP | S2 |
| 0x8035 | RARP | DISCARD |
| 0x8037 | IPX(NovellNetware) | DISCARD |
| 0x805B | VMTP | DISCARD |
| 0x809B | AppleTalk(EtherTalk) | S4 |
| 0x80F3 | AARP | S4 |
| 0x8137 | NetWare(IPX_OLD) | S4 |
| 0x814C | SNMP over Ethernet | DISCARD |
| 0x8191 | NetBIOS/NetBEUI | DISCARD |
| 0x817D | XTP | DISCARD |
| 0x86DD | IPv6 | S3 |
| 0x8863 | PPPoE Discovery Stage | DISCARD |
| 0x8864 | PPPoE Session Stage | DISCARD |
| 0x9000 | Loopback | DISCARD |
| OTHER | OTHER | DISCARD |

FIG.11A

S1: IPv4 RELATED PACKETS

| ETHER FRAME TYPE | IP HEADER (INCLUDE IP_SEC AUTHENTICATION HEADER PART) | | | | |
|---|---|---|---|---|---|
| | | IP_SEC CHECK | | | |
| | | AUTHENTICATION HEADER (AH) | CODE PAYLOAD HEADER (ESP) | DESTINATION IP ADDRESS | PROTOCOL TYPE |
| 0x8000 | IPv4 | INCLUDED | — | — | — |
| | | NOT INCLUDED | INCLUDED | — | — |
| | | | NOT INCLUDED | (MULTICAST (INCLUDE REGISTRATION CONDITION)) TOP 4 BITS ARE "1110" (CLASS D) AND REGISTERED AND NOT IGMP (224.0.0.1) | ICMP |
| | | | | | IN CASE OF TCP/UDP |
| | | | | | OTHER THAN ABOVE CASES |
| | | | | (BROADCAST) TOP 1 BIT IS "0" (CLASS A) AND BOTTOM 24 BITS ARE ALL "1" | IN CASE OF TCP/UDP |
| | | | | | OTHER THAN ABOVE CASES |
| | | | | (UNICAST) DESTINATION ADDRESS IS OWN IP | ICMP |
| | | | | | TCP |
| | | | | | UDP |
| | | | | | OTHER THAN ABOVE |

FIG.11B

| PROTOCOL HEADER | | | | OPERATION |
|---|---|---|---|---|
| ICMPv4 (ICMPv4 TYPE) | ONLY TCP/UDP | | CHECK ACK/SYN ONLY FOR TCP | |
| | WHETHER CORRE-SPONDING PORT IS OPEN | CHECK CONTROL | | |
| — | — | — | — | PROCESS |
| — | — | — | — | PROCESS |
| IN CASE OF TYPE 8 (REQUEST ECOH) | | — | — | PROCESS |
| OTHER THAN ABOVE CASES | | | | DISCARD |
| | CLOSED | — | — | DISCARD |
| — | OPEN | — | — | PROCESS |
| — | — | — | — | PROCESS |
| | CLOSED | — | — | DISCARD |
| — | OPEN | — | — | PROCESS |
| — | — | — | — | PROCESS |
| IN CASE OF TYPE 8 (REQUEST ECOH) | — | — | — | PROCESS |
| OTHER THAN ABOVE CASES | — | | | DISCARD |
| | CLOSED | — | — | DISCARD |
| | OPEN | IS REQUEST FROM ADDRESS AUTHORIZED TO ACCESS AND PORT THAT IS NOT TARGET OF ACCESS CONTROL? | IN CASE OF ACK=0, SYN=1 | PROCESS |
| | | | OTHER THAN ABOVE CASES | DISCARD |
| — | | OTHER THAN ABOVE | — | DISCARD |
| | CLOSED | — | — | DISCARD |
| — | OPEN | — | — | PROCESS |
| — | — | — | — | PROCESS |

FIG.12

S2: ARP PACKET

| DLC HEADER | ARP HEADER | | OPERATION | EXAMPLE OF ANTICIPATED PACKET |
|---|---|---|---|---|
| EtherFrame | Target IP address | | | |
| TYPE | CHECK WITH OWN IP | CHECK WITH SOURCE IN IP HEADER | | |
| 0x0806 ARP | MATCH | — | PROCESS | ARP REQUEST |
| | — | MATCH | PROCESS | REQUEST TO UPDATE ARP TABLE |
| | NOT MATCH | NOT MATCH | DISCARD | ARP REQUEST TO OTHER APPARATUS |

FIG.13A

S3: IPv6 RELATED PACKETS

| ETHER FRAME TYPE | | CHECK WHETHER PACKET IS DIRECTED TO OWN IP (INCLUDING MULTICAST) | IP HEADER NEXT HEADER | | |
|---|---|---|---|---|---|
| VALUE | MEANING | | VALUE | MEANING | |
| 0x86DD | IPv6 | DIRECTED TO IP OTHER THAN OWN IP | | | |
| | | DIRECTED TO OWN IP | 0x51 | AUTHENTICATION HEADER (AH) | |
| | | | 0x50 | CODE PAYLOAD HEADER (ESP) | |
| | | | 0x58 | ICMPv6 | |
| | | | OTHER | AUTHENTICATION OTHER THAN ICMPv6 | |

FIG.13B

| TYPE (ONLY WHEN ICMPv6) | | | |
|---|---|---|---|
| VALUE | MEANING | CHECK DESTINATION IP ADDRESS | CHECK OTHER ITEM |
| | | | |
| | | | |
| | | | |
| 128 | ECHO REQUEST | OWN IP | |
| | | REGISTERED MULTICAST ADDRESS | |
| | | OTHER THAN ABOVE | |
| 135 | NEIGHBOR ADVERTISEMENTS | OWN IP | |
| | | OTHER THAN ABOVE | |
| 136 | NEIGHBOR ADVERTISEMENTS | OWN IP | |
| | | OTHER THAN ABOVE | S FLAG (REQUEST FLAG) OFF |
| | | | S FLAG (REQUEST FLAG) ON |
| 134 | ROUTER ADVERTISEMENTS | | PRE-FIXED INFORMATION MATCHES CURRENT ADDRESS INFORMATION |
| | | | PRE-FIXED INFORMATION DOES NOT MATCH CURRENT ADDRESS INFORMATION |
| 130 | MULTICAST LISTENER DISCOVERY | CORRESPONDING ADDRESS REGISTERED IN SEARCH-TARGET MULTICAST ADDRESSES | |
| | | OTHER THAN ABOVE | |

FIG.13C

| TYPE (OTHER THAN ICMPv6) | | | |
|---|---|---|---|
| TCP/UDP | | ONLY TCP | |
| CHECK PORT | ACCESS CONTROL CHECK | CHECK ACK,SYN BIT | OPERATION |
| | | | |
| | | | PROCESS |
| | | | PROCESS |
| | | | PROCESS |
| | | | PROCESS |
| | | | REFER TO NEXT HEADER |
| | | | OPERATION |
| | | | REFER TO NEXT HEADER |
| | | | PROCESS |
| | | | PROCESS |
| | | | REFER TO NEXT HEADER |
| | | | REFER TO NEXT HEADER |
| | | | PROCESS |
| | | | PROCESS |
| | | | REFER TO NEXT HEADER |
| PORT CLOSED | | | REFER TO NEXT HEADER |
| PORT OPEN | REQUEST FROM ADDRESS AUTHORIZED TO ACCESS AND PORT THAT IS NOT TARGET OF ACCESS CONTROL | (IN CASE OF TCP) ACK=0 SYN=1 SATISFIED? | PROCESS |
| | | OTHER THAN ABOVE | REFER TO NEXT HEADER |
| | OTHER THAN ABOVE | | REFER TO NEXT HEADER |

INFORMATION PROCESSING APPARATUS, POWER MODE CONTROL METHOD, AND POWER MODE CONTROL PROGRAM PRODUCT

BACKGROUND OF THE INVENTION

1. Field of the Invention

The present invention relates to an information processing apparatus, a power mode control method, and a power mode control program product.

2. Description of the Related Art

In recent years and continuing, network devices are required to consume less power from the viewpoint of reducing emissions of carbon dioxide which causes global warming, and reducing cost with minimizing power consumption. Under such circumstances, for the purpose of reducing power consumption, network devices (devices in a network) such as information processing apparatuses and image processing apparatuses with the following function are being proposed. That is, network devices with a power saving mode (also referred to as energy saving mode or sleep mode) are proposed, to maintain the device in a low-power consumption state as long as possible. In a network device having an energy saving function, when there are no instructions to operate for a certain period of time, power consumption is reduced by switching to a sub-CPU which consumes less power, from the main-CPU which is used in a regular power mode.

In recent years and continuing, networks are becoming increasingly complex, and various network-compatible devices are connected to the network. Devices with an OS (Operating System) such as Windows (registered trademark) perform packet communications on a regular basis, and transmit predetermined packets on a regular basis. Accordingly, a network device needs to frequently receive packets that are regularly transmitted by the OS and to transmit packets that are regularly requested by the OS. For this reason, it is becoming increasingly difficult to maintain the power saving mode where power consumption is low.

In the device disclosed in patent document 1, it is possible to set the conditions for returning to a regular power mode from the energy saving mode. Accordingly, when a particular packet is received, the network device can return to the regular power mode from the energy saving mode. In an actual network environment, the network device frequently receives search packets from search applications and search packets from Windows (registered trademark). These packets are processed in the regular power mode. However, in the power saving mode, these packets are deemed as ineffective (i.e., unnecessary and therefore do not need to be processed). Accordingly, power consumption can be reduced by maintaining the power saving mode as long as possible. When the device disclosed in patent document 1 is in a power saving mode, it does not return to the regular power mode when the above packets are received, and continues to maintain the power saving mode. Accordingly, power consumption is reduced by maintaining the energy saving mode as long as possible.

Patent Document 1: Japanese Laid-Open Patent Application No. 2006-309731

In the invention disclosed in patent document 1, packets that are processed in the regular power mode are ineffective (unnecessary) in the power saving mode, so that a power saving mode can be maintained as long as possible. However, as described above, in recent years and continuing, the network is becoming increasingly complex and network devices need to frequently respond to requests for processing packets from the network. Therefore, even if the network device had a power saving mode function, it would be difficult to switch to the power saving mode. Accordingly, the network device is in an environment where the function of the power saving mode cannot be fully put into practice. That is, there is a need for a network device supporting plural network protocols to smoothly switch to the power saving mode from the regular power mode. This is also a problem which needs to be addressed for the purpose of saving energy.

SUMMARY OF THE INVENTION

The present invention provides an information processing apparatus, a power mode control method, and a power mode control program product, in which one or more of the above-described disadvantages are eliminated.

A preferred embodiment of the present invention provides an information processing apparatus, a power mode control method, and a power mode control program product, in which unnecessary packet processing is eliminated in a regular power mode, and the apparatus can smoothly switch to the power saving mode.

According to an aspect of the present invention, there is provided an information processing apparatus including a first control unit configured to control a system relevant to the information processing apparatus; a second control unit configured to control a network controller that is connected to a network and that controls a process relevant to packets; a packet table in which at least one packet to be processed by the first control unit is registered, among the packets transmitted/received via the network; and a determining unit configured to determine whether the system can switch to a power saving mode, wherein in the event that the first control unit does not process the packets for at least a certain period of time, the information processing apparatus switches from a regular power mode in which both the first control unit and the second control unit are operating, to the power saving mode in which power is not supplied to the first control unit; and in the event that the determining unit determines that the system can switch to the power saving mode from the regular power mode, the network controller processes the packets based on the packet table.

According to an aspect of the present invention, there is provided a power mode control method performed by an information processing apparatus including a first control unit configured to control a system relevant to the information processing apparatus, and a second control unit configured to control a network controller that is connected to a network and that controls a process relevant to packets, wherein in the event that the first control unit does not process the packets for at least a certain period of time, the information processing apparatus switches from a regular power mode in which both the first control unit and the second control unit are operating, to a power saving mode in which power is not supplied to the first control unit, wherein the power mode control method includes a determining step of determining whether the system can switch to the power saving mode; and a processing step of causing the network controller to process the packets based on a packet table in which at least one packet to be processed by the first control unit is registered among the packets transmitted/received via the network, in the event that it is determined at the determining step that the system can switch to the power saving mode from the regular power mode.

According to one embodiment of the present invention, an information processing apparatus, a power mode control method, and a power mode control program product are provided, in which unnecessary packet processing is eliminated in a regular power mode, and the apparatus can smoothly switch to the power saving mode.

BRIEF DESCRIPTION OF THE DRAWINGS

Other objects, features and advantages of the present invention will become more apparent from the following detailed description when read in conjunction with the accompanying drawings, in which:

FIG. 5 illustrates an example of a protocol table;

FIG. 6 illustrates another example of a protocol setting page;

FIG. 7 illustrates another example of a protocol table;

FIG. 10 is a diagram for describing protocol identification;

FIGS. 11A and 11B are additional diagrams for describing protocol identification;

FIG. 12 is yet another diagram for describing protocol identification; and

FIGS. 13A, 13B, and 13C are yet further additional diagrams for describing protocol identification.

DETAILED DESCRIPTION OF THE PREFERRED EMBODIMENTS

A description is given, with reference to the accompanying drawings, of embodiments of the present invention.

<Outline and Configuration of Image Processing Apparatus>

Figure 1:
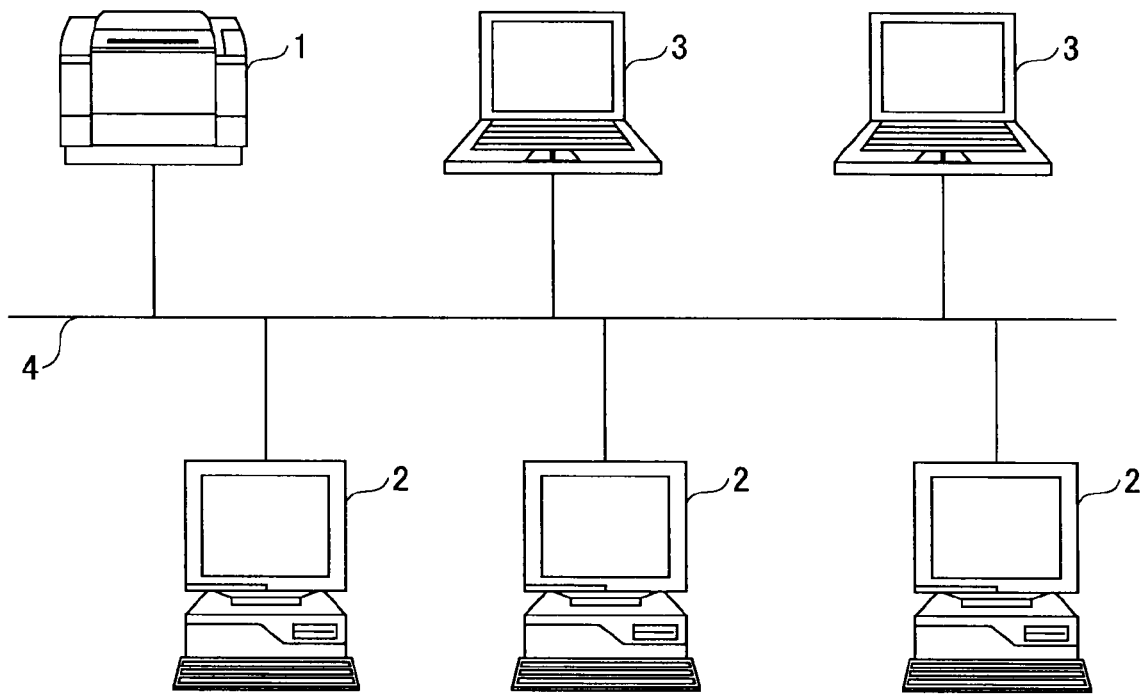
FIG. 1 illustrates an example of a network configuration according to an embodiment of the present invention.

A description is given of an image processing apparatus according to an embodiment of the present invention. FIG. 1 illustrates the overall system in which the image processing apparatus is used. The system includes an image processing apparatus 1, servers 2, PCs 3 (personal computers), and a network 4.

The image processing apparatus 1 is described as follows. The image processing apparatus 1 according to the present embodiment is a network printer. For example, the image processing apparatus 1 receives a print request from the servers 2 and the PCs 3 via the network 4, and provides print services.

Furthermore, the image processing apparatus 1 supports plural network protocols. The image processing apparatus 1 is connected to the network 4, and when the image processing apparatus 1 receives a network protocol which it supports, the image processing apparatus 1 provides the service corresponding to the received protocol. Examples of network protocols are a broadcast packet, a protocol complying with a print protocol (LPR, IPP, FTP, SMTP, etc.), a protocol complying with a utility protocol (SNMP, SLP, etc.), and a start-up dedicated packet.

Furthermore, the image processing apparatus 1 according to the present embodiment is provided with a power saving mode function. There is a regular power mode and a power saving mode. When the image processing apparatus 1 is not operating, it switches to the power saving mode to reduce power consumption. This is further described below.

The servers 2 and the PCs 3 are connected to the network 4. These devices have an OS (Operating System) such as Windows (registered trademark), and transmit/receive various network packets via the network 4. There are various network packets according to the function of the server and the PC, and examples are an OS-based protocol packet and a broadcast system packet. These packets are transmitted to the image processing apparatus 1.

The image processing apparatus 1 is a printer. However, the image processing apparatus 1 can also be a digital color multifunction peripheral referred to as an MFP having multiple functions such as a copying function, a fax function, a scanner function, and a function for delivering an input image. However, as a matter of simplifying the description, it is assumed that the image processing apparatus 1 is a printer. That is, the present invention is not limited to a particular embodiment, and can be applied to a copier, a fax machine, a scanner, an information processing apparatus, etc., which are connected to a network, without departing from the scope of the present invention.

<Functions of Image Processing Apparatus>

Figure 2:
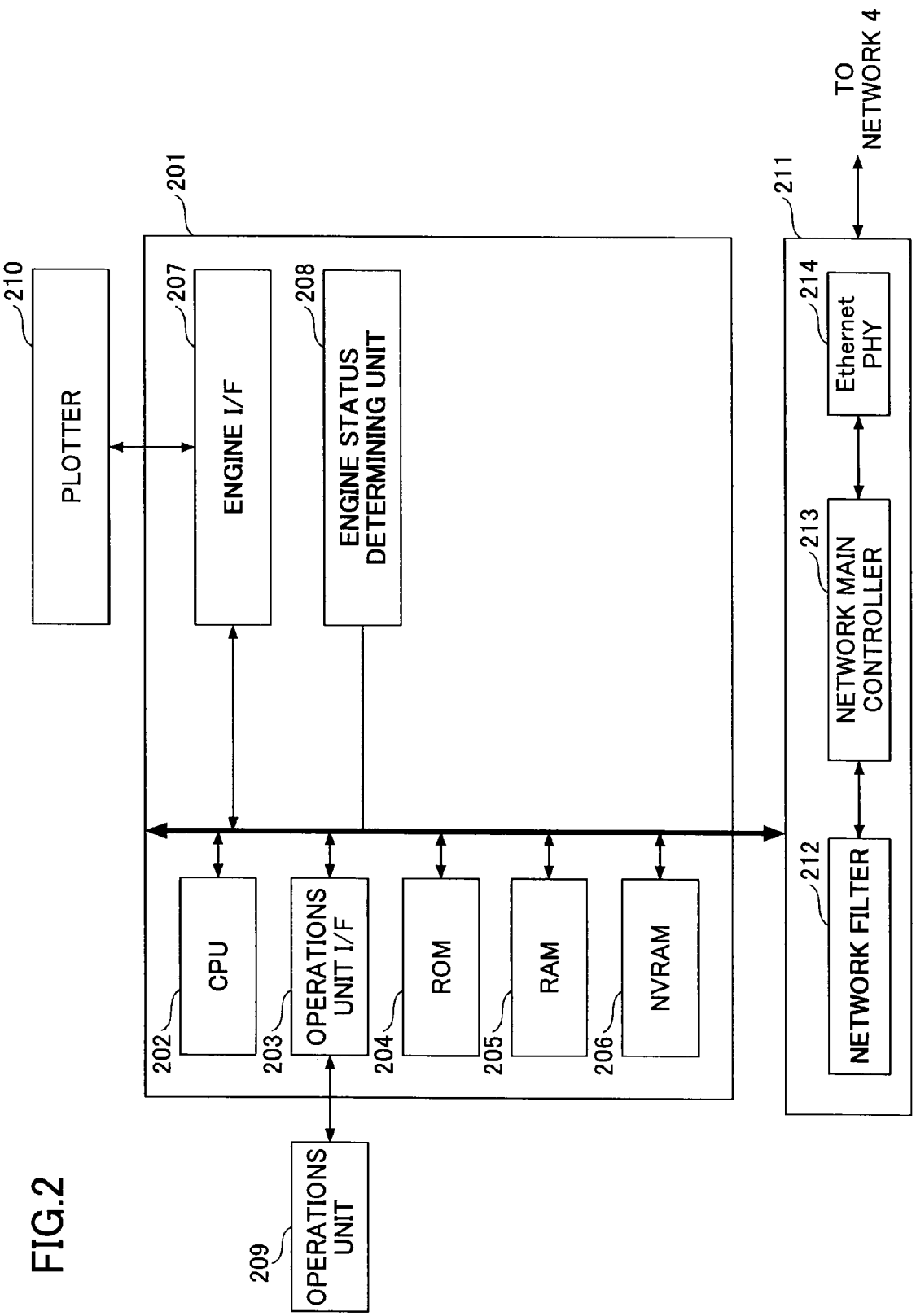
FIG. 2 is a functional block diagram of an image processing apparatus embodiment of the present invention.

A description is given of functions of the image processing apparatus 1. A brief description is given of aspects relevant to the present invention. FIG. 2 is a functional block diagram of the image processing apparatus 1 according to an embodiment of the present invention. The image processing apparatus 1 includes a controller 201, a network controller 211, a plotter 210, and an operations unit 209.

The controller 201 includes a main CPU 202, an operations unit I/F (interface) 203, a ROM 204, a RAM 205, an NVRAM 206, an engine I/F 207, and an engine status determining unit 208. The controller 201 controls the entire system with the main CPU 202. In the image processing apparatus 1, the controller 201 particularly controls the plotter 210 pertaining to the printer function via the engine I/F 207. The main CPU 202 corresponds to the first control unit.

The ROM 204 stores programs executed by the main CPU 202 and font information. The RAM 205 stores programs executed by the main CPU 202, parameters for various work items, and packets acquired from the network. The NVRAM 206 is a non-volatile memory, which is used for saving information that should not be erased when the power is turned off, such as system settings and a system log.

The engine status determining unit 208 is aware of the status of the plotter (engine) 210, and determines whether the plotter 210 is in a status for switching to the power saving mode (whether an internal condition is satisfied). For example, when no printing requests are received for a certain period of time from the server 2, the PC 3, or by instructions directly input by the user, the plotter 210 is in a status for switching to the power saving mode (internal condition is satisfied). The engine status determining unit 208 manages this status, and conveys to a network main controller 213 that the internal condition is satisfied.

The network controller 211 includes a network filter 212, the network main controller 213, and an Ethernet PHY 214. The network main controller 213 controls the entire network controller 211, and includes a sub CPU which operates even in the power saving mode. The sub CPU corresponds to the second control unit. Even if the sub CPU is not included, a function corresponding to the sub CPU can be implemented by hardware logic.

Among the packets received via the Ethernet PHY 214, packets that can be processed by the sub CPU are processed by the network main controller 213, but packets that cannot be processed by the sub CPU are processed by the main CPU 202. Furthermore, among the packets transmitted by the image processing apparatus 1 via the network controller 211, packets that can be processed by the sub CPU are processed by the network main controller 213, but packets that cannot be processed by the sub CPU are processed by the main CPU 202. The processes performed on the packets to be transmitted and received are described below. The image processing apparatus 1 according to the present embodiment supports plural network protocols, and it is determined which CPU is to process a packet depending on the protocol of the packet.

The network filter 212 is the filter according to an embodiment of the present invention, which filters the packets transmitted/received via the network 4. A received packet is filtered to determine whether it is to undergo a receiving process based on a protocol table described below. A transmitted packet is filtered to determine whether it is to undergo a transmitting process based on a protocol table described below. This filter operates in accordance with an operation start instruction of the network main controller 213, when the network main controller 213 receives from the engine status determining unit 208 a notification that the internal condition is satisfied. Details are given below. Furthermore, the Ethernet PHY 214 is a physical layer interface. The network 4 is a wired and wireless network, and the Ethernet PHY 214 is an interface suited for the network 4.

<Power Saving Mode>

Next, a description is given of the power saving mode. A brief description is given of aspects relevant to the present invention.

The image processing apparatus 1 switches to the power saving mode when a certain power saving mode switching condition is satisfied, such as data is not input to the control unit from outside for a certain period of time, or a specification is received from a control unit of the image processing apparatus 1 or from a terminal connected to the network 4. In this mode, power is not supplied to the controller 201 including the main CPU 202. That is, current is not applied from a power source circuit for supplying power to the controller 201. Application of current is controlled by a power source control unit via a power source control line. The power source control unit turns on/off the current application to the main CPU 202 according to instructions from the power source managing unit or the sub CPU included in the network main controller 213.

In the power saving mode, driving power is not supplied to the controller 201 including the main CPU 202, and therefore the main CPU 202 does not operate, and the ROM 204 and the RAM 205 cannot be used. Meanwhile, current is applied to the network controller 211 and the units related to the power control line.

In the power saving mode, power is not supplied to the controller 201, and communications with the network 4 are controlled by the sub CPU of the network controller 211. If the data input via the network 4 can be processed by the sub CPU, the power saving mode is continued. However, if print data or other packets that cannot be processed by the sub CPU are input from the server 2 or the PC 3 via the network 4, the sub CPU cannot process such data, and therefore current application to the controller 201 is started and the mode is switched from the power saving mode to the regular power mode.

The power mode is switched in accordance with predetermined power mode switching conditions. Of particular note is that the power saving mode switching conditions, which are conditions for switching from the regular power mode to the power saving mode, vary according to the properties of the apparatus. In the image processing apparatus 1 according to an embodiment of the present invention, the power saving mode switching conditions include an internal condition and an external condition. The internal condition is that the plotter engine has not been operated for a certain period of time. The external condition is that data packets have not been transmitted/received via the network for a certain period of time. When the internal condition and the external condition are satisfied, the image processing apparatus 1 switches from the regular power mode to the power saving mode. As described above, the power mode switching conditions vary according to the properties of the apparatus. When the apparatus is not an image processing apparatus, the external condition is that data packets have not been transmitted/received via the network for a certain period of time, and internal condition corresponds to a condition other than the external condition among the switching conditions determined for the apparatus, so that the present invention can be applied.

<Operations>

The image processing apparatus 1 according to an embodiment of the present invention includes the function described with reference to FIG. 2, and is connected to the network environment described with reference to FIG. 1. The image processing apparatus 1 constantly transmits/receives various packets because it is connected to the network 4.

For example, in a network environment using Windows (registered trademark) as the OS, every 30 seconds, an MIB (Management Information Base) packet of the SNMP (Simple Network Management Protocol) for monitoring the network device is transmitted/received. For example, in a network environment where 30 PCs with such an OS are connected, the image processing apparatus 1 needs to perform the receiving/transmitting process for the MIP packet every second, because the processing of such MIB packets involves a transmitting process. By performing a transmitting/receiving process of SNMP packets, the image processing apparatus 1 can be aware of and can manage the devices in the network. For example, when viewed from a PC, the devices present in the network are shown by icons.

However, SNMP packets are packets that are processed by the main CPU 202, and therefore while SNMP packets are being processed, the image processing apparatus 1 cannot switch to the power saving mode. The purpose of the power saving mode is to reduce power consumption by cutting off the power to the controller 201 including the main CPU, while the system (plotter, engine) relevant to the apparatus is not used. However, as for the plotter 210 of the image processing apparatus 1, even when it is ready to switch to the power saving mode because it has not been used for a certain period of time (internal condition satisfied), the external condition cannot be easily satisfied because packets from the network need to processed. Consequently, the plotter 210 would not be able to switch to the power saving mode.

In the image processing apparatus 1 according to an embodiment of the present invention, when the plotter 210 is ready to switch to the power saving mode as it has not been used for a certain period of time (internal condition is satisfied), in the network main controller 213, the network filter 212 filters the packets. Specifically, when the internal condition of the system is satisfied during the regular power mode, the packets to be processed are filtered and classified, to facilitate the switching to the power saving mode. For example, it is possible to identify an SNMP.MIB packet from Windows (registered trademark) based on a value in the OID (Object ID) region in an SNMP message. When the OID has the following values, the corresponding packet is blocked and is not processed.

OID 1.3.6.1.2.1.25.3.2.1.5.1
OID 1.3.6.1.2.1.25.3.5.1.1.1

OID 1.3.6.1.2.1.25.3.5.1.2.1

When the filter for SNMP packets is operating, the image processing apparatus 1 does not transmit SNMP packets, and therefore the icon of the image processing apparatus 1 will not appear in other PCs. However, to actually use the image processing apparatus 1, the image processing apparatus 1 is searched by transmitting another kind of SNMP.MIB packet. Therefore, there is no need for special operations to actually use the image processing apparatus 1. Furthermore, in order to execute printing operations, if an instruction is given as a registered printing operation from the PC, a normal printing operation can be performed regardless of whether SNMP packets are being processed or not. When the plotter 210 is not yet ready to switch to the power saving mode (internal condition is not satisfied), the filter does not operate, and SNMP packets are normally processed, so that the icon of the image processing apparatus 1 is displayed on other PCs. As described below, it is possible to set which protocol is to be filtered, and therefore the protocol to be subject to filtering can be set according to the network environment and operations.

Figure 3:
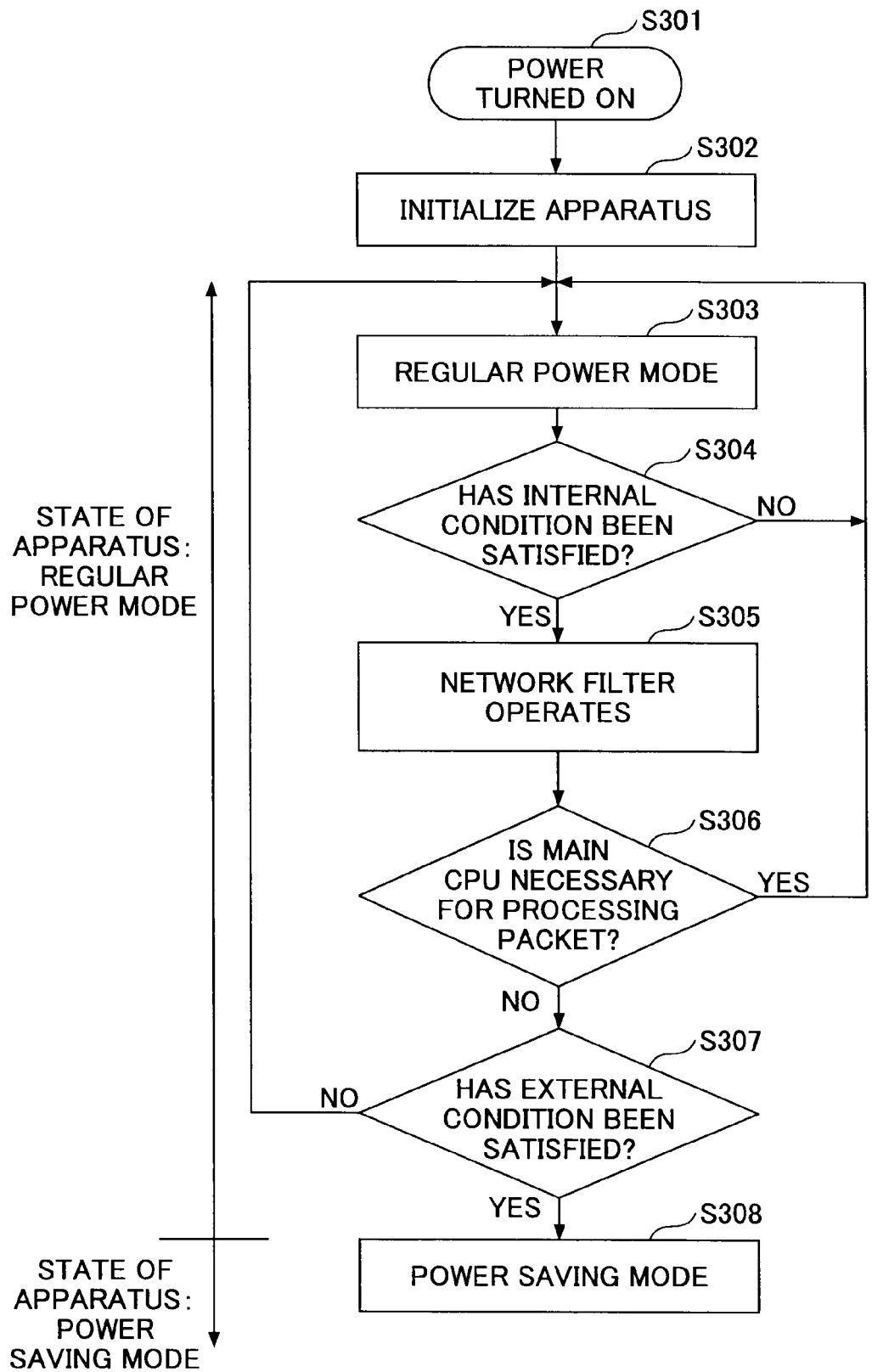
FIG. 3 is a flowchart for describing the timings at which a network filter operates.

FIG. 3 is a flowchart for describing the timings at which the network filter 212 operates. In step S301, the power of the image processing apparatus 1 is turned on. In step S302, an initialization process inside the apparatus is performed. When the initialization is completed, the apparatus starts up, and in step S303, the image processing apparatus 1 operates in a regular power mode. The entire system is controlled and operated by the controller 201.

In step S304, it is determined whether the internal condition is satisfied. That is, if the plotter 210 were not used for a certain period of time, it would be in a status where it can switch to a power saving mode. The engine status determining unit 208 is aware of the status of the plotter (engine) 210, and conveys to the network main controller 213 that the internal condition has been satisfied. The network main controller 213 instructs the network filter 212 to start the operation of filtering packets. In step S305, the network filter 212 receives this instruction, and starts filtering the packets based on a protocol table specifying the packets to be processed by the main CPU. The protocol table is described below.

Step S306 is performed to determine whether the main CPU is necessary for processing a packet that is transmitted/received.

First, a description is given of the case of receiving a packet. If the packet received via the network 4 can be processed by the sub CPU of the network main controller 213, this packet is processed by the sub CPU of the network main controller 213. Meanwhile, if the packet received via the network 4 cannot be processed by the sub CPU of the network main controller 213, the network main controller 213 performs a filtering process with the network filter 212, to determine whether the packet is to undergo a receiving process. If the packet is registered in the protocol table, the packet is to undergo a receiving process, and is therefore processed by the main CPU. In this case, the process proceeds to "Yes" in step S306.

Next, description is given of the case of transmitting a packet. If the packet to be transmitted via the network 4 can be processed by the sub CPU of the network main controller 213, this packet is processed by the sub CPU of the network main controller 213. Packets that are transmitted on a regular basis require a relatively simple process, and thus can be processed by the network main controller 213 in most cases. Meanwhile, if the packet to be transmitted via the network 4 cannot be processed by the sub CPU of the network main controller 213, the network main controller 213 performs a filtering process with the network filter 212, to determine whether the packet is to undergo a transmitting process. If the packet is registered in the protocol table, the packet is to undergo a transmitting process, and is therefore processed by the main CPU. In this case, the process proceeds to "Yes" in step S306.

Step S307 is performed to determine whether the external condition is satisfied. The packet filter is operated by the network filter 212, and therefore transmitting/receiving processes are not performed for packets that are not set/registered in the protocol table (unnecessary packets). If there are no packets that require a transmitting/receiving process by the main CPU (external condition satisfied), in step S308, the image processing apparatus 1 switches to the power saving mode. Unnecessary packets, i.e., packets that require a process by the main CPU, are eliminated by the filtering operation from and beyond step S305, and therefore the external condition can be easily satisfied. Accordingly, even in a network environment in which packets requiring processes are frequently exchanged, the image processing apparatus according to an embodiment of the present invention can smoothly switch to the power saving mode. That is, the image processing apparatus 1 can be in a power saving mode as long as possible, and therefore the power consumption can be reduced. Next, a detailed description is given of the protocol table.

<Protocol Table/Setting Page>

Figure 4:
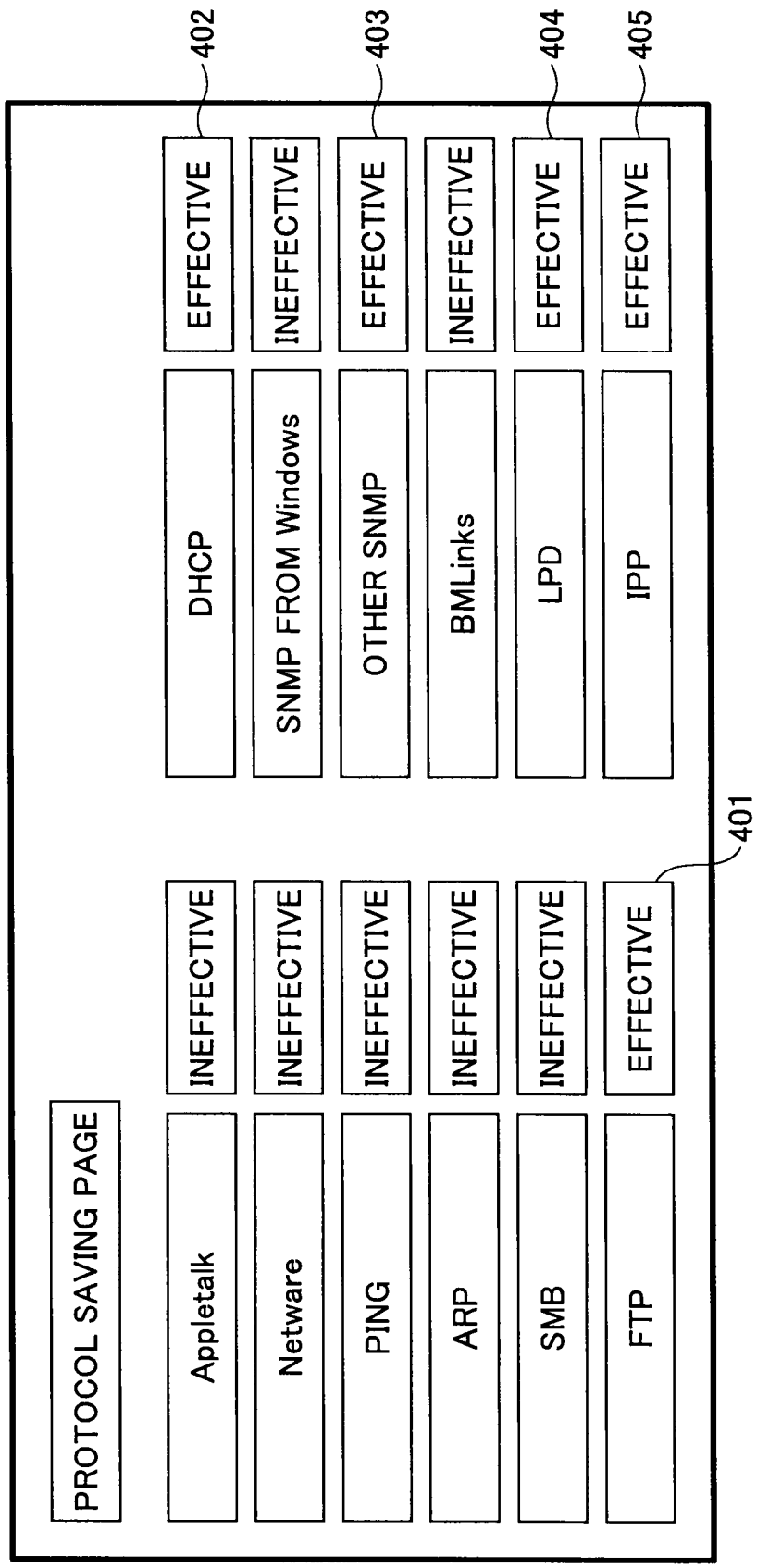
FIG. 4 illustrates an example of a protocol setting page.

The network filter 212 identifies the packet which is to be processed by the main CPU based on the protocol table (packet table). FIG. 4 illustrates an example of a protocol setting page. Settings can be made from the operations unit I/F 203. A protocol table is created in accordance with the protocols set in this setting screen. FIG. 5 illustrates a protocol table A corresponding to the setting screen.

After the internal condition is satisfied, the network filter 212 does not process packets corresponding to protocols set as "ineffective" (i.e., unnecessary) in the protocol table. The protocols referred to in this case are protocols which do not require processes by the main CPU. Furthermore, the protocols comply with the apparatus. Specifically, in the case of the image processing apparatus 1, the protocol depends on the OS of the image processing apparatus 1, and the protocol pertains to the printer function.

In the example of the protocol setting screen shown in FIG. 4, "FTP" 401, "DHCP" 402, "other SNMP" 403, "LDP" 404, and "IPP" 405 are set as "effective" (i.e., necessary and therefore need to be processed). In correspondence with these settings, in the protocol table A shown in FIG. 5, "FTP" 501, "DHCP" 502, "other SNMP" 503, "LDP" 504, and "IPP" 505 are set as "effective". "Effective" means that a process is to be performed, and "ineffective" means that a process is not to be performed. For example, "FTP" 501 is set as "effective", and therefore a packet using the FTP protocol is processed by the main CPU 202. The setting contents indicating which protocol is to be "effective" and which protocol is to be "ineffective" can be appropriately determined according to the network environment in which the image processing apparatus 1 is used. A protocol table and a protocol setting screen can be provided for each of packets received and packets transmitted by the image processing apparatus 1. In this case, the network filter 212 performs the filtering operation for the receiving process of packets based on the protocol table relevant to received packets, and performs the filtering operation for the transmitting process of packets based on the protocol table relevant to packets to be transmitted.

Accordingly, although there are various protocols pertaining to the network packets used according to the network environment, it is possible to arbitrarily set the packets to be filtered according to the network environment with the above-described protocol setting function.

<Modification>

Based on the protocol table described above, a description is given of an image processing apparatus according to a modification of the embodiment according to the present invention. Specifically, an embodiment of the present invention is applied to an image processing apparatus that maintains the power saving mode as long as possible by using a protocol table during the power saving mode so that the image processing apparatus does not easily return to the regular power mode. The image processing apparatus according to the present modification includes a protocol table B shown in FIG. 7, in addition to the protocol table A shown in FIG. 5. Similar to the protocol table A, settings can be made for the protocol table B, from the protocol setting page shown in FIG. 6. The image processing apparatus according to the present modification has two protocol tables, and switches to using one or the other depending on the state.

Figure 8:
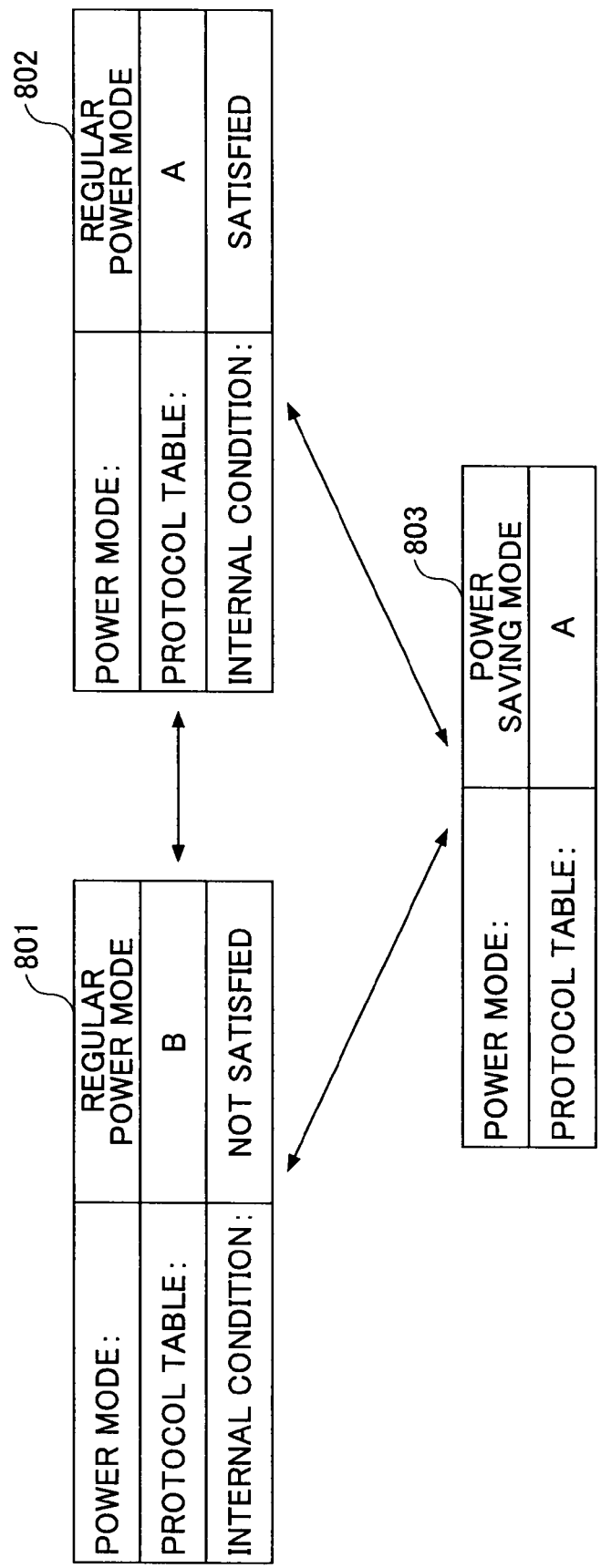
FIG. 8 is a state transition diagram pertaining to the power mode.

FIG. 8 is a state transition diagram indicating the power mode and the protocol table to be applied. FIG. 8 indicates protocol tables A and B. Protocol table A is, for example, the protocol table A shown in FIG. 5. Protocol table B is, for example, the protocol table B shown in FIG. 7. The protocol table A includes more protocols that are set as being "ineffective" compared to the protocol table B. That is, more packets are set to be "ineffective".

In the regular power mode denoted by 801, the protocol table B is applied. In the power saving mode denoted by 803, the protocol table A is applied. In the regular power mode, unnecessary packets are eliminated by a filtering operation performed based on the protocol table B. In the power saving mode, in order to maintain a sleeping status as long as possible, processing is not performed for packets which require processing by the main CPU and which are not of an important protocol. In such a case, the protocol table A is used. For example, "PING" is processed in a regular power mode. However, if "PING" were processed in the power saving mode, the image processing apparatus would return to the regular power mode. Therefore, in protocol table A, "PING" is set as "ineffective".

In the regular power mode denoted by 802, the protocol table A is applied. Although the image processing apparatus 1 is in a regular power mode at 802, the internal condition is satisfied, and therefore the image processing apparatus 1 can switch to the power saving mode as the printer engine has not been used for a certain period of time. Thus, in this stage, the protocol table A is used, which is also used in the power saving mode, so that the image processing apparatus 1 can easily switch to the power saving mode. Accordingly, processing is not performed for packets which require processing by the main CPU and which are not of an important protocol.

Unnecessary packets requiring processing by the main CPU are eliminated, and therefore the external condition can be easily satisfied. Accordingly, even in a network environment in which packets requiring processes are frequently exchanged, the image processing apparatus according to the present modification can smoothly switch to the power saving mode. That is, the image processing apparatus 1 can be in a power saving mode as long as possible, and therefore the power consumption can be reduced.

Furthermore, when the internal condition is not satisfied in the regular power mode, i.e., when the image processing apparatus 1 is fully operating, by eliminating packets that are not necessary to process, and by applying the protocol table used during the power saving mode also during the regular power mode and after the internal condition has been satisfied, the packets can be controlled with a consistent policy. Furthermore, it would be possible to simplify the process of designing the image processing apparatus.

<Identification of Protocol of Packet>

As described above, the image processing apparatus 1 according to an embodiment of the present invention filters protocols set in the protocol table, to determine whether to process a packet received via the network 4. A description is given of the process of identifying the protocol of the received packet performed by the image processing apparatus 1. Overall, the protocol of the received packet is identified based on information in the packet header, etc.

Figure 9:
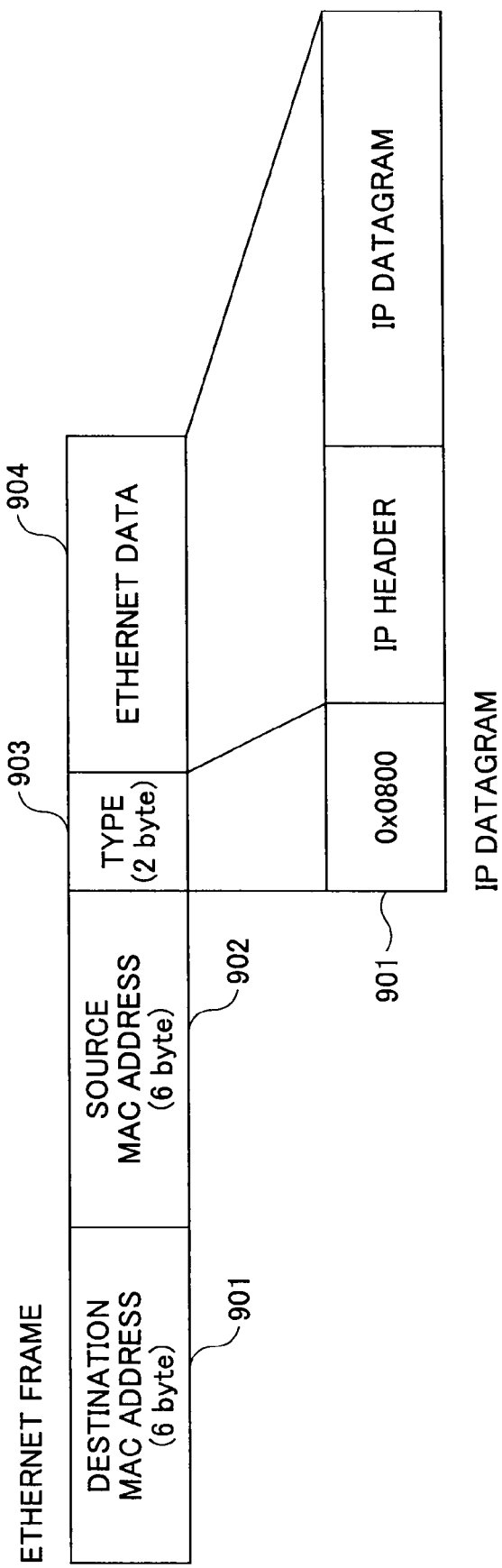
FIG. 9 illustrates an Ethernet frame.

FIG. 9 illustrates an Ethernet frame according to the IEEE 802.3 specification. The Ethernet frame corresponds to the data link layer of the OSI (Open System Intereconnection) reference model. The Ethernet frame includes fields of a destination MAC address 901, a source MAC address 902, a type 903, and Ethernet data 904. In the type 903 field, the protocol type is prescribed. In identifying the protocol, sorting is first performed based on the value of the type 903. FIG. 10 indicates protocols 1000 corresponding to the values in the type 903. For example, if the value of the type 903 were "0x0800" 1002, the corresponding packet would be a packet of "IPv4 (Internet Protocol Version 4)" 1003. If the value of the type 903 were "0x814C" 1005, the corresponding packet would be a packet of "SNMP over Ethernet" 1006.

"Operation" 1001 indicates the process to be performed on the corresponding packet. If the type 903 were "0x814C" 1005, the packet would be "discarded" 1007. This "operation" corresponds to the contents set in the protocol table. In this case, the filter classification for the protocol of "SNMP over Ethernet" in the protocol table is set as "ineffective".

If the type 903 were "0x0800" 1002, the corresponding packet would be a packet of "IPv4" 1003. In a case of a packet of "IPv4", it is further segmented, and therefore the process cannot be determined only from the value of the type 903. Accordingly, the process proceeds to the next step. In this case, the operation is prescribed as "S1" 1004, and therefore the process proceeds to step S1.

FIGS. 11A and 11B show the packet processing operation (S1) of the image processing apparatus according to an embodiment of the present invention, when the value of the type 903 is "0x0800", i.e., the corresponding packet is of "IPv4". With regard to a packet of "IPv4", the packet is identified based on the IP header and the TCP/UDP header in upper layers of the OSI reference model. Accordingly, it is determined whether to process or discard the packet of "IPv4" as indicated in FIGS. 11A and 11B. Structures of the IP header and the TCP/UDP header are well known and therefore details are omitted.

FIG. 12 shows the packet processing operation of the image processing apparatus according to an embodiment of the present invention, when the value of the type 903 is "0x0806", i.e., the corresponding packet is of "ARP". It is determined whether to process or discard the packet of "ARP" based on ARP header information, as indicated in FIG. 12.

FIGS. 13A, 13B, and 13C show the packet processing operation of the image processing apparatus according to an embodiment of the present invention, in which the value of the type 903 is "0x86DD", i.e., the corresponding packet is of "IPv6". Detailed descriptions are omitted, but similar to the above, it is determined whether to process or discard the packet of "IPv6" based on header information.

According to one embodiment of the present invention, an information processing apparatus, a power mode control method, and a power mode control program product are provided, with which unnecessary packet processing is eliminated in a regular power mode, and the apparatus can smoothly switch to the power saving mode. The present invention is not limited to the specifically disclosed embodiment, and variations and modifications may be made without departing from the scope of the present invention.

According to an aspect of the present invention, there is provided an information processing apparatus including a first control unit configured to control a system relevant to the information processing apparatus; a second control unit configured to control a network controller that is connected to a network and that controls a process relevant to packets; a packet table in which at least one packet to be processed by the first control unit is registered, among the packets transmitted/received via the network; and a determining unit configured to determine whether the system can switch to a power saving mode, wherein in the event that the first control unit does not process the packets for at least a certain period of time, the information processing apparatus switches from a regular power mode in which both the first control unit and the second control unit are operating, to the power saving mode in which power is not supplied to the first control unit; and in the event that the determining unit determines that the system can switch to the power saving mode from the regular power mode, the network controller processes the packets based on the packet table.

According to an aspect of the present invention, there is provided an information processing apparatus including a first control unit configured to control a system relevant to the information processing apparatus; a second control unit configured to control a network controller that is connected to a network and that controls a process relevant to packets; a packet table in which at least one packet to be processed by the first control unit is registered, among the packets transmitted/received via the network during a power saving mode; and a determining unit configured to determine whether the system can switch to the power saving mode, wherein in the event that the first control unit does not process the packets for at least a certain period of time, the information processing apparatus switches from a regular power mode in which both the first control unit and the second control unit are operating, to the power saving mode in which power is not supplied to the first control unit; and in the event that the determining unit determines that the system can switch to the power saving mode from the regular power mode, the network controller processes the packets based on the packet table.

Additionally, the information processing apparatus switches to the power saving mode based on an internal condition relevant to the system and an external condition relevant to the network.

Additionally, in the information processing apparatus, the network controller identifies a packet attribute based on a header of each of the packets, to process the packets that have been received.

Additionally, in the information processing apparatus, the packets include SNMP (Simple Network Management Protocol) packets; and the header includes an OID (Object ID) region.

Additionally, in the information processing apparatus, a packet attribute of the at least one packet registered in the packet table can be set.

Additionally, the information processing apparatus comprises an image processing apparatus.

According to an aspect of the present invention, there is provided a computer-readable recording medium having recorded therein instructions for causing a computer to perform a power mode control method.

The above elements, expressions, and combinations of elements can be applied to a method, an apparatus, a system, a computer program product, and a recording medium to implement an embodiment of the present invention.

The present application is based on Japanese Priority Patent Application No. 2008-026600, filed on Feb. 6, 2008, the entire contents of which are hereby incorporated herein by reference.

What is claimed is:

1. An information processing apparatus, comprising:
a first control unit configured to control a system relevant to the information processing apparatus;
a second control unit configured to control a network controller that is connected to a network and that controls a process relevant to packets;
a packet table in which at least one packet to be processed by the first control unit is registered, among the packets transmitted/received via the network; and
a determining unit configured to determine whether the system can switch to a power saving mode,
wherein when the first control unit does not process the packets for at least a certain period of time, the information processing apparatus switches from a regular power mode in which both the first control unit and the second control unit operate at a capacity to process packets, to the power saving mode in which power is not supplied to the first control unit;
when the determining unit determines that the system can switch to the power saving mode from the regular power mode, the network controller processes the packets based on the packet table; and
the packets are processed based on the packet table in both the regular power mode and the power saving mode.

2. The information processing apparatus according to claim 1, wherein:
the information processing apparatus switches to the power saving mode based on an internal condition relevant to the system and an external condition relevant to the network.

3. The information processing apparatus according to claim 1, wherein:
the network controller identifies a packet attribute based on a header of each of the packets, to process the packets that have been received.

4. The information processing apparatus according to claim 3, wherein:
the packets comprise SNMP (Simple Network Management Protocol) packets; and
the header comprises an OID (Object ID) region.

5. The information processing apparatus according to claim 1, wherein:
a packet attribute of the at least one packet registered in the packet table can be set.

6. The information processing apparatus according to claim 1, wherein:
the information processing apparatus comprises an image processing apparatus.

7. A power mode control method performed by an information processing apparatus including a first control unit configured to control a system relevant to the information processing apparatus, and a second control unit configured to control a network controller that is connected to a network and that controls a process relevant to packets, wherein when the first control unit does not process the packets for at least a certain period of time, the information processing apparatus switches from a regular power mode in which both the first control unit and the second control unit operate at a capacity to process packets, to a power saving mode in which power is not supplied to the first control unit, wherein the power mode control method comprises:

determining whether the system can switch to the power saving mode, and causing the network controller to process the packets based on a packet table in which at least one packet to be processed by the first control unit is registered among the packets transmitted/received via the network, when it is determined in the determining step that the system can switch to the power saving mode from the regular power mode, wherein the packets are processed based on the packet table in both the regular power mode and the power saving mode.

8. A non-transitory computer-readable medium that stores a program including instructions for causing a computer to perform a power mode control method according to claim 7.

9. The computer-readable medium according to claim 8, further comprising:

switching to the power saving mode based on an internal condition relevant to the system and an external condition relevant to the network.

10. The computer-readable medium according to claim 8, further comprising:

identifying a packet attribute based on a header of each of the packets, to process the packets that have been received.

11. The computer-readable medium according to claim 10, wherein the identifying step comprises identifying packets that comprise SNMP (Simple Network Management Protocol) packets; and the header comprises an OID (Object ID) region.

12. The computer-readable medium according to claim 8, further comprising:

setting a packet attribute of the at least one packet registered in the packet table.

13. The power mode control method according to claim 7, further comprising:

switching to the power saving mode based on an internal condition relevant to the system and an external condition relevant to the network.

14. The power mode control method according to claim 7, further comprising:

identifying a packet attribute based on a header of each of the packets, to process the packets that have been received.

15. The power mode control method according to claim 14, wherein the identifying step comprises:

identifying packets that comprise SNMP (Simple Network Management Protocol) packets; and the header comprises an OID (Object ID) region.

16. The power mode control method according to claim 7, further comprising:

setting a packet attribute of the at least one packet registered in the packet table.

17. An information processing apparatus, comprising:

a first control unit configured to control a system relevant to the information processing apparatus;

a second control unit configured to control a network controller that is connected to a network and that controls a process relevant to packets;

a packet table in which at least one packet to be processed by the first control unit is registered, among the packets transmitted/received via the network; and a determining unit configured to determine whether the information processing apparatus can switch to a power saving mode, wherein when the first control unit does not process the packets for at least a certain period of time and the packets can be processed by the network controller, as determined from the packet table, the information processing apparatus switches from a regular power mode in which both the first control unit and the second control unit operate at a capacity to process packets, to the power saving mode in which power is not supplied to the first control unit;

when the determining unit determines that the system can switch to the power saving mode from the regular power mode, the network controller processes the packets based on the packet table; and the packets are processed based on the packet table in both the regular power mode and the power saving mode.

* * * * *